(12) United States Patent
Ferlitsch et al.

(10) Patent No.: US 8,305,602 B2
(45) Date of Patent: Nov. 6, 2012

(54) SYSTEMS AND METHODS FOR REMOTELY MANAGING AND CONFIGURING DRIVER SETTINGS

(75) Inventors: Andrew R. Ferlitsch, Camas, WA (US); Gregory E. Borchers, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1554 days.

(21) Appl. No.: 11/537,433

(22) Filed: Sep. 29, 2006

(65) Prior Publication Data

US 2008/0079975 A1 Apr. 3, 2008

(51) Int. Cl.
*G06F 3/12* (2006.01)
*G06K 15/00* (2006.01)
(52) U.S. Cl. ............................. 358/1.15; 358/1.13
(58) Field of Classification Search ......... 358/1.11–1.16
See application file for complete search history.

(56) References Cited

U.S. PATENT DOCUMENTS

| | | | |
|---|---|---|---|
| 5,699,495 A | 12/1997 | Snipp | |
| 5,768,583 A | 6/1998 | Orzol et al. | |
| 5,905,906 A | 5/1999 | Goffinet et al. | |
| 6,301,012 B1 | 10/2001 | White et al. | |
| 2002/0161740 A1 | 10/2002 | Nakamura et al. | |
| 2003/0030842 A1 | 2/2003 | Suyehira | |
| 2003/0097426 A1 | 5/2003 | Parry | |
| 2003/0200289 A1 | 10/2003 | Kemp et al. | |
| 2003/0234950 A1 | 12/2003 | Lay | |
| 2004/0039811 A1* | 2/2004 | Nakamura et al. | 709/223 |
| 2004/0125145 A1* | 7/2004 | Sano et al. | 345/771 |
| 2004/0156056 A1* | 8/2004 | Sawada | 358/1.2 |
| 2004/0250264 A1 | 12/2004 | Kato | |
| 2005/0012954 A1 | 1/2005 | Onuma et al. | |
| 2005/0068560 A1* | 3/2005 | Ferlitsch | 358/1.13 |
| 2006/0170943 A1* | 8/2006 | Hanson et al. | 358/1.13 |
| 2006/0274368 A1* | 12/2006 | Imine | 358/1.15 |
| 2007/0171448 A1* | 7/2007 | Liu | 358/1.13 |
| 2009/0089811 A1* | 4/2009 | Ferlitsch | 719/321 |
| 2010/0182638 A1* | 7/2010 | Kimura et al. | 358/1.15 |

FOREIGN PATENT DOCUMENTS

| | | |
|---|---|---|
| EP | 0415861 | 1/1996 |
| EP | 1357467 | 10/2003 |
| JP | 08238818 | 9/1996 |
| JP | 2004030576 | 1/2004 |
| JP | 2004-252936 | 9/2004 |
| JP | 2005-165393 | 6/2005 |
| JP | 2006-155288 | 6/2006 |
| JP | 2006-163985 | 6/2006 |

OTHER PUBLICATIONS

Office Action issued for Japanese Patent Application No. JP 2007-230466 on Apr. 13, 2010.
Decision to Grant a Patent issued for Japanese Patent Application No. JP 2007-230466 on Dec. 21, 2010.

* cited by examiner

*Primary Examiner* — Dov Popovici
(74) *Attorney, Agent, or Firm* — Austin Rapp & Hardman

(57) ABSTRACT

A method for managing printer settings is described. Physical printers in electronic communication with a network are discovered. Installed printers, configured with a printer driver, are discovered. The physical printers are associated with the installed printers. One or more default print settings are specified. The one or more default print settings of at least one of the installed printers are updated.

20 Claims, 13 Drawing Sheets

SYSTEMS AND METHODS FOR REMOTELY MANAGING AND CONFIGURING DRIVER SETTINGS

TECHNICAL FIELD

The present invention relates generally to printing devices. More specifically, the present invention relates to systems and methods for remotely managing and configuring driver settings.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Different kinds of computer software facilitate the printing of materials through use of a printer. The computer or computing device that will be used to print the materials typically has one or more pieces of software running on the computer that enable it to send the necessary information to the printer to enable printing of the materials. If the computer or computing device is on a computer network there may be one or more pieces of software running on one or more computers on the computer network that facilitate printing.

Printers typically have default settings for various items. Users may either use the default settings or change these settings when they print. However, the systems currently in place for managing the default settings of a printer are lacking certain features. Benefits may be realized by a providing increased functionality for remotely managing and configuring driver settings.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
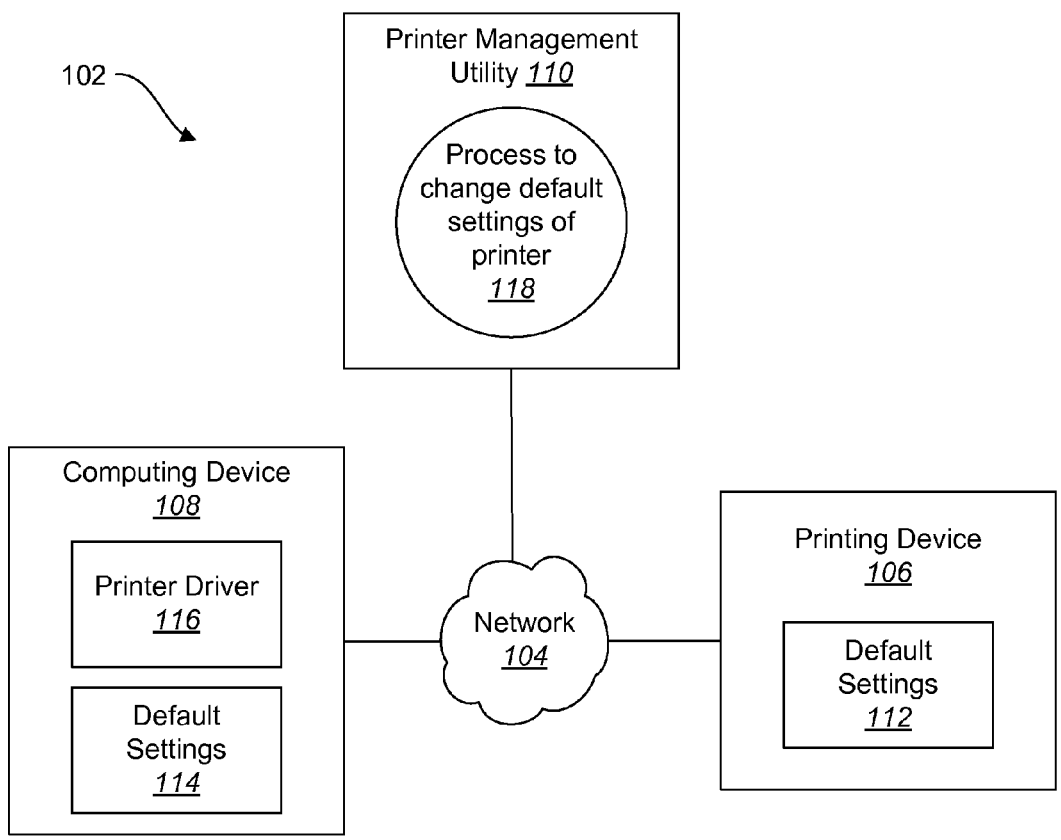
FIG. 1 is a block diagram of an embodiment of a system for remotely managing and configuring printer driver settings.

A method for managing printer settings is described. Physical printers in electronic communication with a network are discovered. Installed printers are discovered. The physical printers are associated with the installed printers. One or more default print settings are specified. The one or more default print settings of at least one of the installed printers are updated.

In one embodiment, information is obtained about the installed printers. The information about the installed printers may be stored in an installed printer database. In one embodiment, the one or more default settings are specified remotely from the installed printers.

In one embodiment, one or more groups of physical printers are specified. The one or more default print settings may be specified for the one or more groups of physical printers. In one embodiment, at least one of the installed printers is identified based on the one or more groups of physical printers specified.

A physical printer may be queried for at least one of the physical printer's default settings. In one embodiment, a subnet or range of communication addresses is used to discover the physical printers. Communication addresses for the physical printers associated with each discovered installed printer may be determined.

An apparatus for managing printer driver settings is also disclosed. A processor and memory in electronic communication with the processor is disclosed. Instructions are stored in the memory. Physical printers in electronic communication with a network are discovered. Installed printers are discovered. The physical printers are associated with the installed printers. One or more default print settings are specified. The one or more default print settings of at least one of the installed printers are updated.

A computer-readable medium comprising executable instructions for implementing a method for managing printer settings is also disclosed. Physical printers in electronic communication with a network are discovered. Installed printers are discovered. The physical printers are associated with the installed printers. One or more default print settings are specified. The one or more default print settings of at least one of the installed printers are updated.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment, "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

A printer management utility allows print administrators to manage printing devices for a select number of management features. There are some management features that would be desirable. One such desired feature is to be able to reconfigure the default settings of installed printers associated with one or more physical printers. Therefore, there is a desire for an effective method to discover installed printers associated with a physical printer and then reconfigure one or more default print settings of the installed printers. As used herein, an installed printer refers to a logical printer on a host computing device. For example, such as a printer icon seen in the printers folder in Microsoft Windows. An installed printer typically includes the following components: a printer driver, a port monitor, a print processor, port settings, and spooler settings.

One method of reconfiguring the default print settings is demonstrated by the Microsoft Windows Printing Preferences. In this method, the user chooses a printer from the printers folder. The user then right clicks on the printer icon to display a context menu. One of the selections on this menu is printing preferences. When the user selects this option, the printer driver associated with the installed printer displays the printer's property pages. The printer's property pages are used to set the default settings of one or more of the printer's print options (e.g., duplex, staple, copies, etc). Once the user applies the new settings, any subsequent invocation of the installed printer will be initialized with the new default settings. But this method still has limitations, in that (1) it is manually set, and (2) it is set locally and not set remotely.

Other methods exist for setting default print settings. In one method, the default print settings may be set on the physical printing device. For example, in an HP PJL compliant printer, the printer's default print settings can be set by downloading a print job, which contains commands (i.e., @PJL DEFAULT) that direct the printer to change the default settings of the specified printer's environment variables, which are associated with one or more print settings. However in this method the device specific default settings only apply if a remote job does not reset one or more of the settings. Generally, most printer drivers reset each setting, even when the setting is not specifically reset by the user (i.e., set to the installed printer's default setting).

In another variation of the above HP PJL protocol, a user can issue a print job that does bi-directional communication between the printer and the host. In this method the print job can query the printer to echo the device's default print settings (i.e., @PJL DINQUIRE) back to the host.

FIG. 1 is a block diagram of an embodiment of a system 102 for remotely managing and configuring default settings 114, 112 of a printing device 106. A computer network 104 provides electronic communication between a printing device 106, a computing device 108 and a printer management utility 110 that is on the computer network 104. The disclosed systems and methods describe an effective method for a printer management utility 110 to reconfigure the default print settings 112, 114 of installed printers, within a network domain, associated with a physical printer 106. The computing device 108 includes an installed (logical) printer driver 116 that enables it to print to the printing device 106. A printing device 106 is any device that performs an imaging operation on an input that produces an output, such as a printer, scanner, copier, facsimile device, filing device, publishing device, digital video camera, digital audio recorder, electronic white board, CD/DVD-writer, client/server computing device (e.g., raster image processor (RIP) server), etc.

The printer management utility 110 includes a process 118 for changing printer driver settings 114, as will be discussed herein. In one embodiment the operating environment includes several processes running on one or more computing devices which can perform the following administrative services: (1) discover physical printers connected to the network within some subset of the network domain, (2) discover installed printers on computing hosts within some subset of the network domain, and (3) query and optionally set device default settings on the physical printers.

The Sharp Printer Admin Utility (PAU) 4.0 demonstrates one method of managing printers and can be used in the operating environment. In this utility, the operator can input a range of communication addresses (e.g., IP addresses) within the network domain to discover printing devices to manage. The method uses a network sweep method, where each communication address is checked for a communicating device. The method further uses a filtering process to filter out non-printing devices from the communicating devices. The discovered printing devices, and associated attributes (e.g., make, model, etc), are then stored in a device database. The device database can then be used as a repository for various management purposes.

Figure 2:
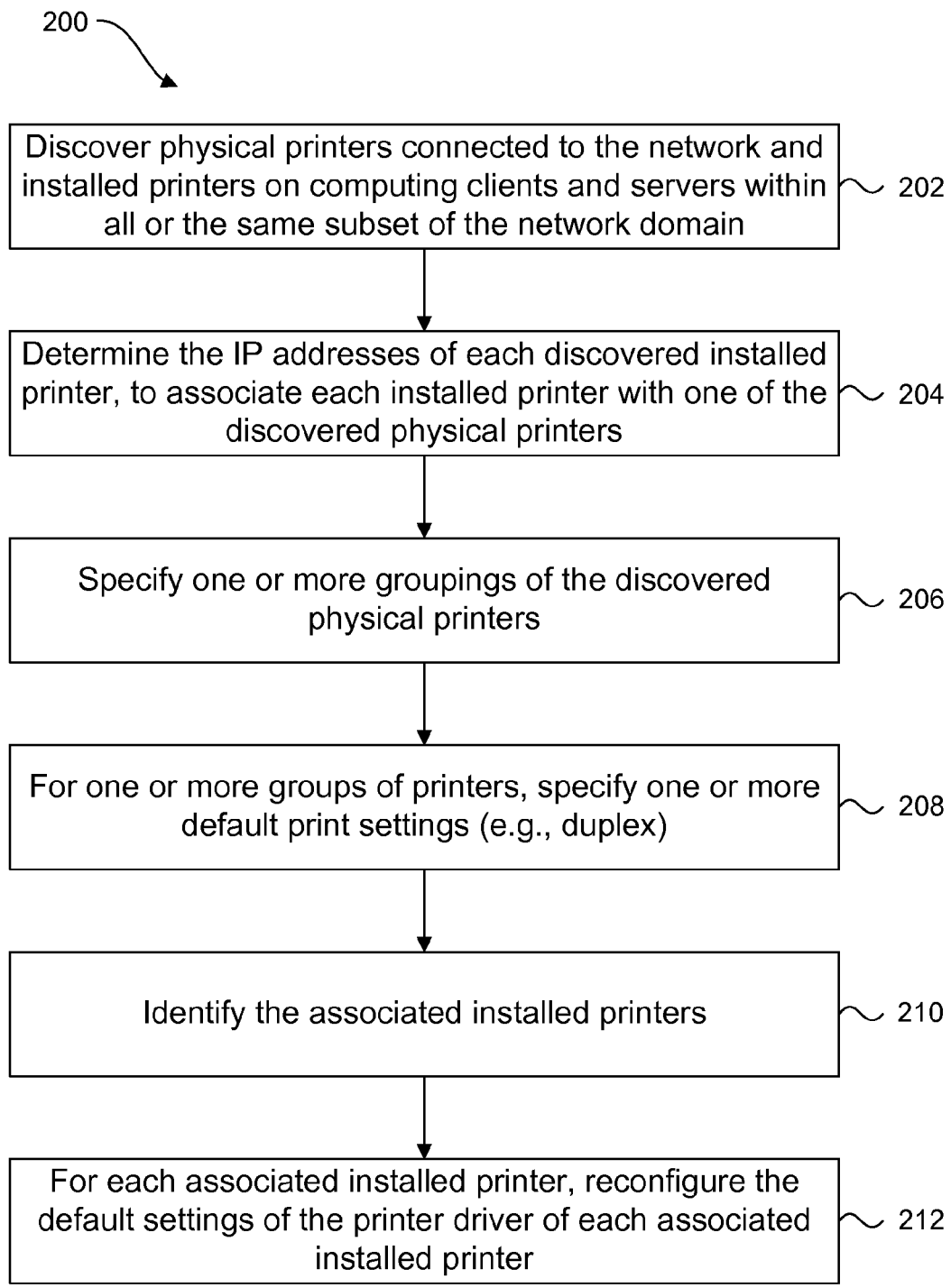
FIG. 2 is a flow diagram of an embodiment of a method for remotely managing and configuring printer driver settings.

FIG. 2 is a flow diagram of an embodiment of a method 200 for remotely managing and configuring printer driver settings. The printer management utility 110 discovers 202 physical printers connected to the network 104 within all or a subset of the network domain. Additionally, the printer management utility 110 discovers 202 installed printers on computing clients and servers within all or the same subset of the network domain. Then the communication address (e.g., IP addresses) of each discovered physical printer and the communication port (e.g., IP address) of each installed printer are determined 204 to associate each installed printer with one of the discovered physical printers.

Using the information gathered, as described above and more generally herein, the printer management utility 110 specifies 206 one or more groupings of the discovered physical printers. For one or more groups of printers, the printer management utility 110 may then specify 208 one or more default print settings (e.g., duplex). The associated installed printers are then identified 210. For each associated installed printer, using network administrative authority, the printer management utility 110 reconfigures 212 the default settings of the printer driver of each associated installed printer (via the remote spooler interface), to the specified default print setting.

In another variation, the printer management utility 110 may perform the following. Using the information gathered, as described above and more generally herein, the printer management utility 110 specifies 206 one or more groupings of the discovered physical printers. For one or more groups of printers, the printer management utility 110 may then specify 208 one or more default print settings (e.g., duplex, paper size). For each identified device setting, the utility 110 may query the physical printer for the device's default setting. The associated installed printers are then identified 210. For each associated installed printer, using network administrative authority, the printer management utility 110 reconfigures 212 the default settings of the printer driver of each associated installed printer (via the remote spooler interface), to the specified default print setting.

Figure 3:
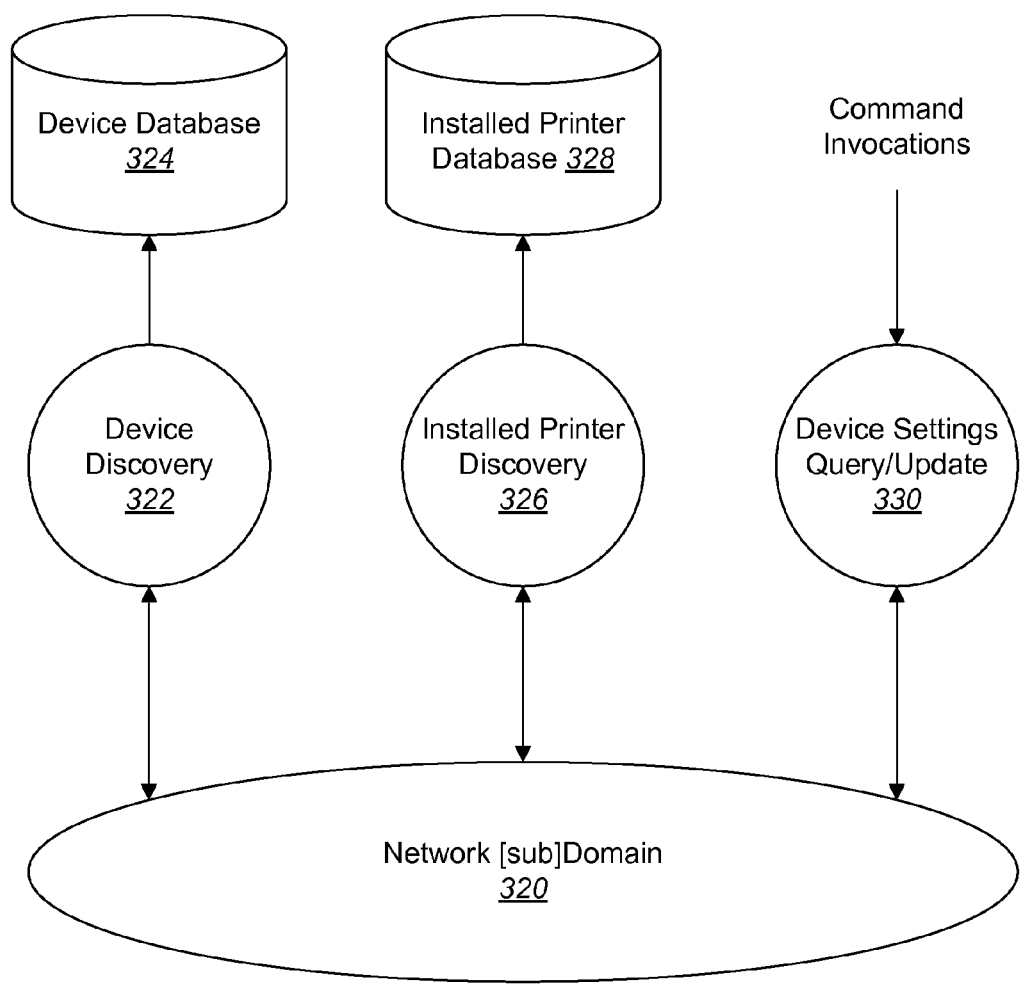
FIG. 3 is a block diagram illustrating an embodiment of an operating environment of one or more network connected printing devices within a network domain.

FIG. 3 is a block diagram illustrating an embodiment of an operating environment 302 of one or more network connected printing devices within a network domain 320. An embodiment of a network domain 320 is illustrated below in FIG. 15. The operating environment 302 also includes a host computing device (illustrated in FIGS. 1 and 14) from which management services are administered to one or more types of network devices within the network domain 320.

One of these management services is a device discovery service 322. The device discovery service 322 includes discovering the network connected devices within the network domain 320. For example, an operator may specify a subnet or range of communication addresses (e.g., IP addresses) to discover devices. Within the subnet or range, the process 322 may first determine which communication addresses have connected devices either through a broadcast, multicast or unicast sweep through the communication addresses to determine which addresses respond. The ICMP ping protocol is one example of a communication protocol that can be used to determine whether a communication address has a responding connected device.

The responding connected devices may then be further filtered for a class of devices of interest (e.g., printers) by querying each device using a device management protocol (e.g., SNMP, Web Device Profile (WDP) web service) for information on the device (e.g., model, device class, etc). The discovered devices of interest are then recorded into a discovered device database 324, along with other attribute information obtained through the discovery/query process 322.

Another management service includes an installed printer driver discovery service 326. The installed printer driver discovery service 326 discovers installed (logical) printer drivers on computing hosts within the network domain 320. For example, an operator may specify a subnet or range of communication addresses (e.g., IP addresses) to discover hosts with installed printer drivers. Within the subnet or range, the process 326 may query the local and remote spooler interfaces to enumerate all installed printer drivers on the corresponding local and remote computing devices. For example, within the Microsoft Windows family of operating system, installed printer drivers within all or a subset of the network domain can be enumerated using the Win32 EnumPrinters( ) API call.

The discovered installed printer drivers may then be further filtered by querying each installed printer driver (e.g., Win32 GetPrinter( ) API) for printer/port information. For example, the process 326 may filter out installed printer drivers that are not associated with a physical printer. The discovered installed printer drivers of interest are then recorded into a discovered installed printer driver database 328, along with other attribute information obtained through the discovery/query process 326.

Another management service includes a device settings query/update service 330 that queries a physical printer for the printer's default settings. For example, the process 330 may query one or more printers in the network domain 320 to obtain one or more of the printer's default device settings. For example, the query may be done as @PJL DINQUIRE command over a bi-directional communication connection (e.g., port 9100). The default device settings are then recorded in a database, such as the installed printer driver database 328.

Figure 4:
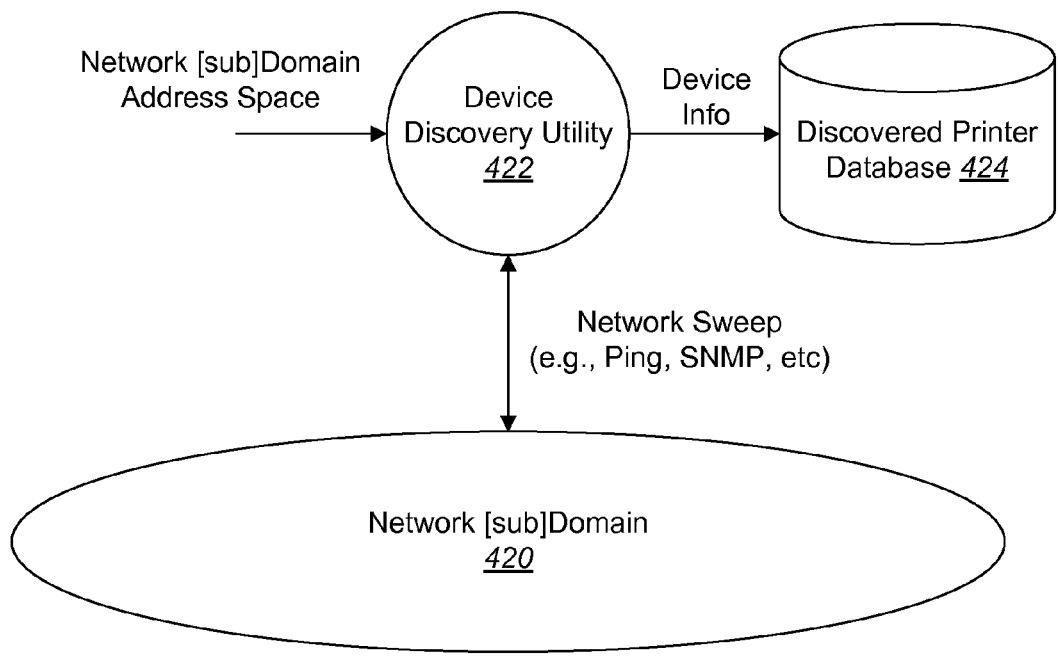
FIG. 4 is a block diagram illustrating an embodiment of the discovery of printer devices.

FIG. 4 is a block diagram illustrating an embodiment of the discovery of printer devices. The printer management utility 110 application discovers printers within a network domain 420, such as using the systems and methods described in FIG. 3. The discovery process may be initiated by any means, such as (1) manual initiation by an operator, (2) automatic initiation by an event, or (3) periodic. The configuration for the discovery process may either be entered manually or it may be preprogrammed. The discovery process may be performed over any range of the communication addresses within the network domain 420, such as (1) the entire WAN, (2) one or more subnets (e.g., class C or CIDR) within the network domain 420, or (3) a set of ranges of consecutive sequences of communication addresses.

The discovery utility 422 may perform filtering to include or exclude devices from the discovery. The devices discovered may be filtered according to various parameters including, but not limited to, (1) device class (e.g., printer), (2) manufacturer and/or model, (3) device capabilities (e.g, color vs. black and white, finisher vs. no-finisher), (4) locality (e.g., department, building, region, physical location (e.g., GPS)), (5) input format support (e.g., Postscript, PCL, PDF, image formats), (6) IP address or range of addresses, or (7) access and other security rights.

Discovered devices may be queried for additional information. Each discovered device which meets the criteria may be further queried (e.g., SNMP) for additional information, such as (1) physical capabilities (e.g., duplex, collator, finisher), (2) emulation capabilities (e.g., print formats, sheet assembly, color management, etc), (3) physical attributes (e.g., pages per minute), or (4) installed options. The above discovered printers and information may then be recorded into a discovered printer database 424 (e.g., Oracle, FoxPro, Microsoft Access, flat file, system registry, etc).

The above information may also be obtained by querying a repository which contains predetermined information on specific manufacturer models. For example, such as the repository and method as disclosed in U.S. patent application Ser. No. 10/397,014 for "User-definable print-option conversion for heterogeneous cluster printing," which is incorporated herein by reference.

Figure 5:
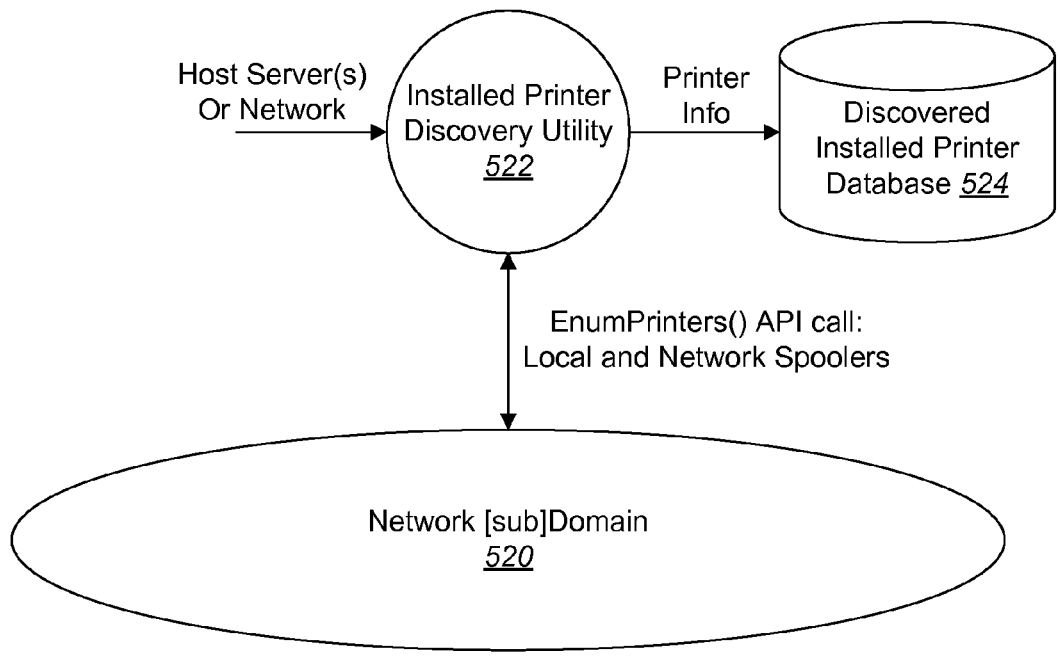
FIG. 5 is a block diagram illustrating an embodiment of the discovery of installed printer drivers with a network domain.

FIG. 5 is a block diagram illustrating an embodiment of the discovery 522 of installed printers with a network domain 520. The printer management utility 110 application discovers installed printers within a network domain 520, such as using the systems and methods described in FIG. 3. The discovery process 522 may be initiated by any means, such as (1) manual initiation by an operator, or (2) automatic initiation by an event (e.g., completion of the device discovery), or (3) periodic. The discovery process 522 may be performed over any range of the communication addresses within the network domain 520, such as those described earlier. The range may be the same as that for discovering the physical printers. However, in certain embodiments the range is not the same as that for discovering the physical printers.

In one embodiment, the discovery process 522 works by identifying all the remote spoolers within the network domain range, and querying each spooler to enumerate the installed printer drivers on the corresponding host computing device. For example, in Microsoft Windows, the Win32 EnumPrinters( ) API could be used to identify all print servers, and a second invocation of EnumPrinters( ) could be used to identify all installed printer drivers on each print server.

Other methods could be used to identify all the connected computing hosts within the network domain 520. For example, the device discovery process 522 could also identify and record each connected device that is a computing host. The Win32 EnumPrinters( ) API call could then be issued for each computing host recorded in the database.

The discovery utility 522 may perform filtering to include or exclude installed printer drivers from the discovery. Any filter(s) may be used, such as filtering by (1) owner (i.e., network user) of the installed printer, (2) PDL type of the configured printer driver, (3) port connection (e.g., exclude installed printers which are not connected to a specific physical printer ~e.g., print to file), (4) printer driver model or (5) capabilities of the printer driver Each discovered installed printer that meets the criteria may be further queried (e.g., Win32 GetPrinter( )) for additional information, such as (1) port information, (2) printer driver name, (3) spooler settings, or (4) print filters and other post-processing functions. The above discovered installed printers and information may then be stored into a database 524 (e.g., Oracle, FoxPro, Microsoft Access, flat file, system registry, etc).

Figure 6:
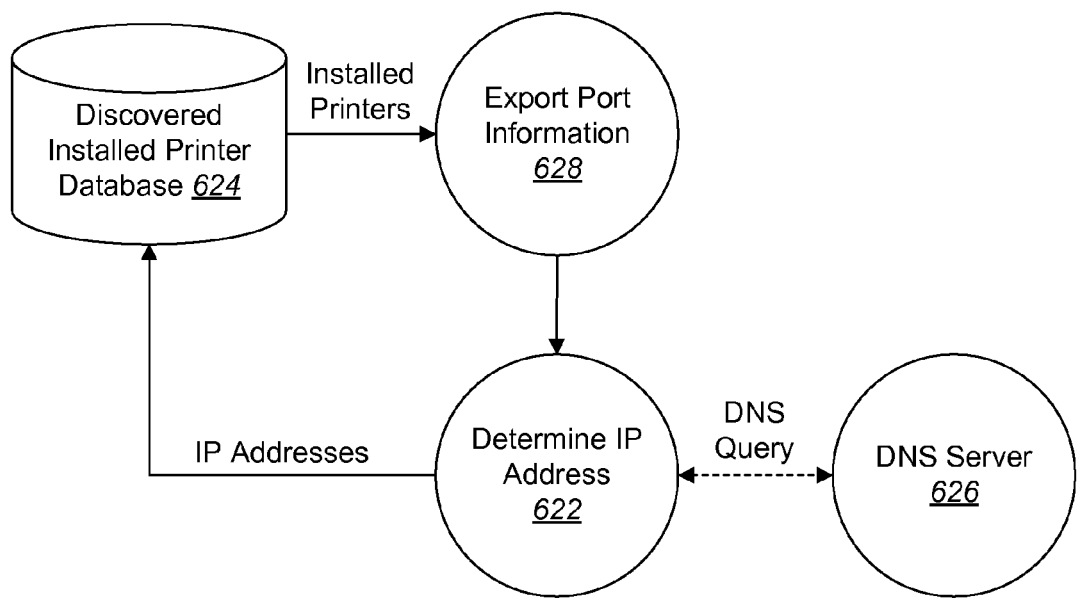
FIG. 6 is a block diagram illustrating an embodiment of the determination of the communication address of the physical printer associated with each discovered installed printer driver.

FIG. 6 is a block diagram illustrating an embodiment of the determination 622 of the communication address of the physical printer associated with each discovered installed printer. The printer management utility 110 application determines 622 the communication address of the physical printer associated with each discovered installed printer. Generally, this would be determined from the port information configured for the installed printer. In Microsoft Windows, the port information is in a syntax that is specific to the port monitor. Therefore, the port information is extracted 628 and parsed according to the syntax of the associated port monitor. For example, if the monitor is the standard TCP/IP port monitor, the port information is a key to a registry entry in the system registry under the HKEY_LM\System\CurrentControlSet\Control\Print\Monitors\Standard TCP/IP Port\Ports section. Under this key is a field called IPaddress which contains the IP address of the printing device. Other well-known port monitors also use the registry and store either the IP address or a URL or DNS name which can be reversed looked up in a DNS/WINS name server 626 to determine the IP address.

The DPAPI component of the Sharp Development Kit is an example of a product that is able to determine the IP addresses of installed printers for many well-known port monitors. Another method of determining the IP address of a printer is to send a special (non-printing) print job to the printer, which instructs the printer to send back to the caller the IP address of the printer. The Sharp Notify Job Return (NJR) protocol is an example of this method. Once the IP address is determined for each of the installed printers, the IP address information is recorded back to the discovered installed printer database 624.

Figure 7:
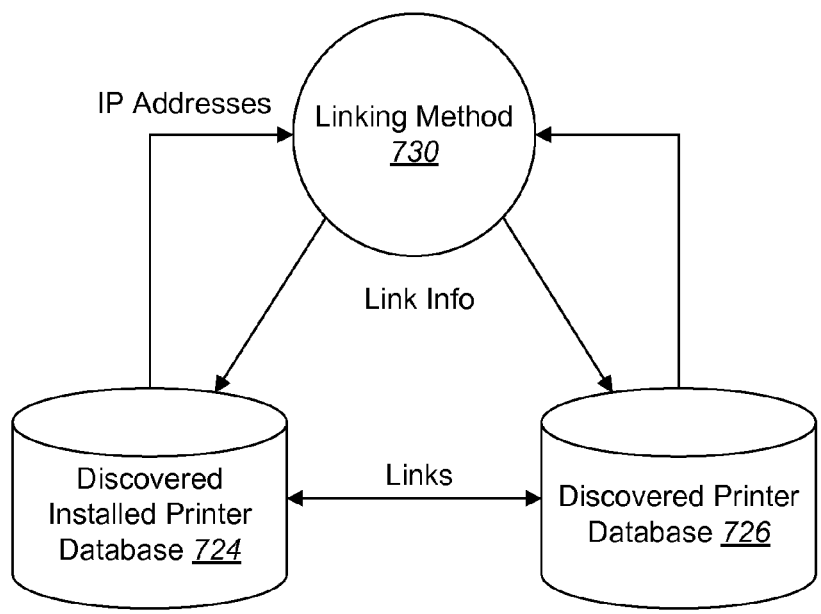
FIG. 7 is a block diagram illustrating an embodiment of associating the discovered printer database and the discovered installed printer driver database together.

FIG. 7 is a block diagram illustrating an embodiment of associating the discovered printer database 726 and the discovered installed printer database 724 together. After the printer management utility 110 application has completed both the physical printer and installed printer discovery and determined the configured communication ports of the installed printers, the utility 110 then links 730 the two databases together. This phase is accomplished by matching up the associated communication (e.g., IP) address of each installed printer from the discovered installed printer database 724 to a printer entry in the discovered printer database 726 with the same communication address.

Figure 8:
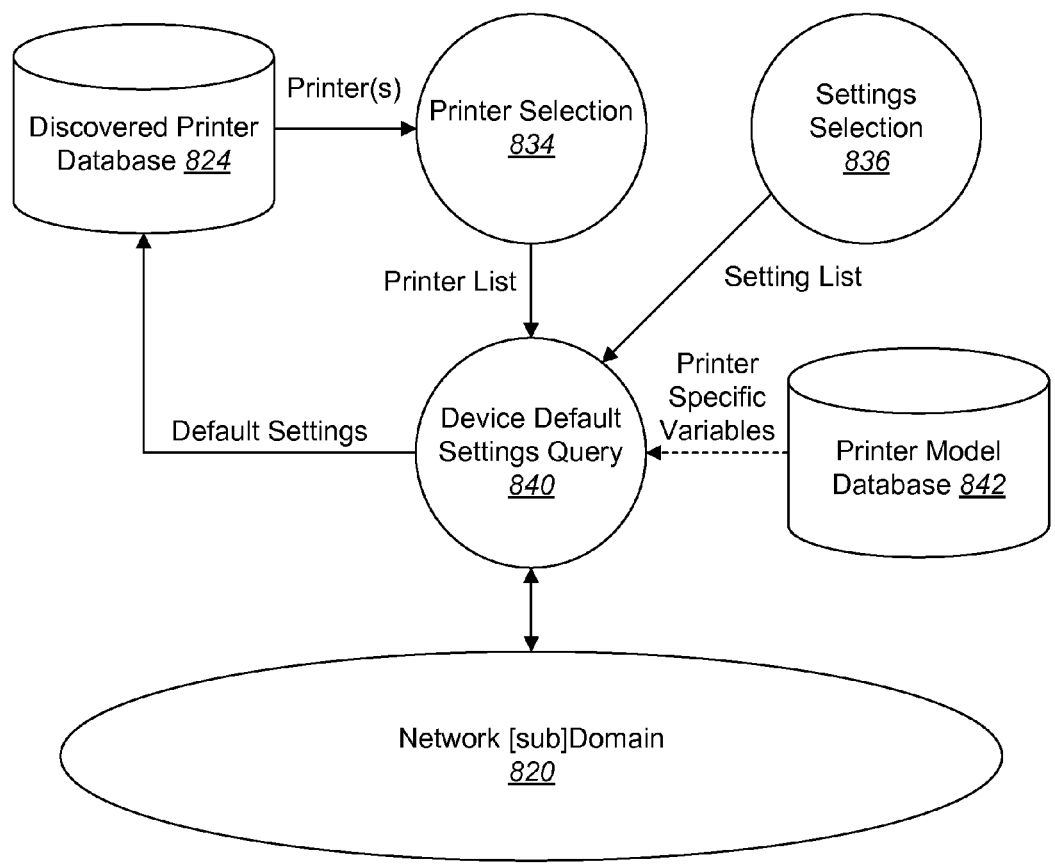
FIG. 8 is a block diagram of an embodiment that operates to obtain selected device default settings from devices.

FIG. 8 is a block diagram of an embodiment that operates to obtain selected device default settings from devices. An operator of the printer management utility 110 application can reconfigure one or more default print settings of one or more installed printers. In one mode, the reconfiguration is based on a select number of device default settings of the corresponding printing devices.

Typically, the operator would specify the following: (1) a group of printing devices 834, and (2) a group of device default settings 836. The group 834 of printing devices may be based on any grouping, such as, but not limited to (1) manually selected by user, (2) grouped by department, (3) grouped by locality (e.g., building, region, etc), (4) grouped by model name, (5) grouped by capability (e.g., language format, duplex, finisher, etc), (6) addition of a new device, or (7) addition of a new component to an existing device. The group 836 of device default settings may be based on any grouping, such as, but not limited to (1) manually selected by user, (2) locale specific type of settings (e.g., default paper size: Letter vs. A4), (3) consumables consumption (e.g., duplex, N-up printing, etc), or (4) tray configuration (e.g., input tray, output bin).

For each printer in the printer group 834, the printer management utility 110 application would query 840 the printer for the corresponding device default setting for each of the specified settings. In one example, the device may be queried using the HP @PJL DINQUIRE protocol. In this case, each setting is associated with one or more job environment variables. The @PJL DINQUIRE call is used to query the values of the associated environment variables.

The names of the environment variables are not universally standard across devices, but many manufacturers use well-known environment variable names (such as those published by the HP Printer Job Language Reference). In one mode, the utility 110 could query the printer based on the well known names. In another mode, the environment variables associated with device settings for a select number of models are published in a printer model database (PMDB) 842. In this case, the printer management utility 110 could then query the PMDB 842, based on the printer's model name, to obtain the environment variables, and then query the printer. An example of a PMDB 842 that would support this operation is disclosed in U.S. patent application Ser. No. 10/397,014 for "User-definable print-option conversion for heterogeneous cluster printing." In another mode, the printing device may support the HP @PJL INFO VARIABLES, which will cause the printing device to echo back the names and current settings of all device configurable variables.

Figure 9:
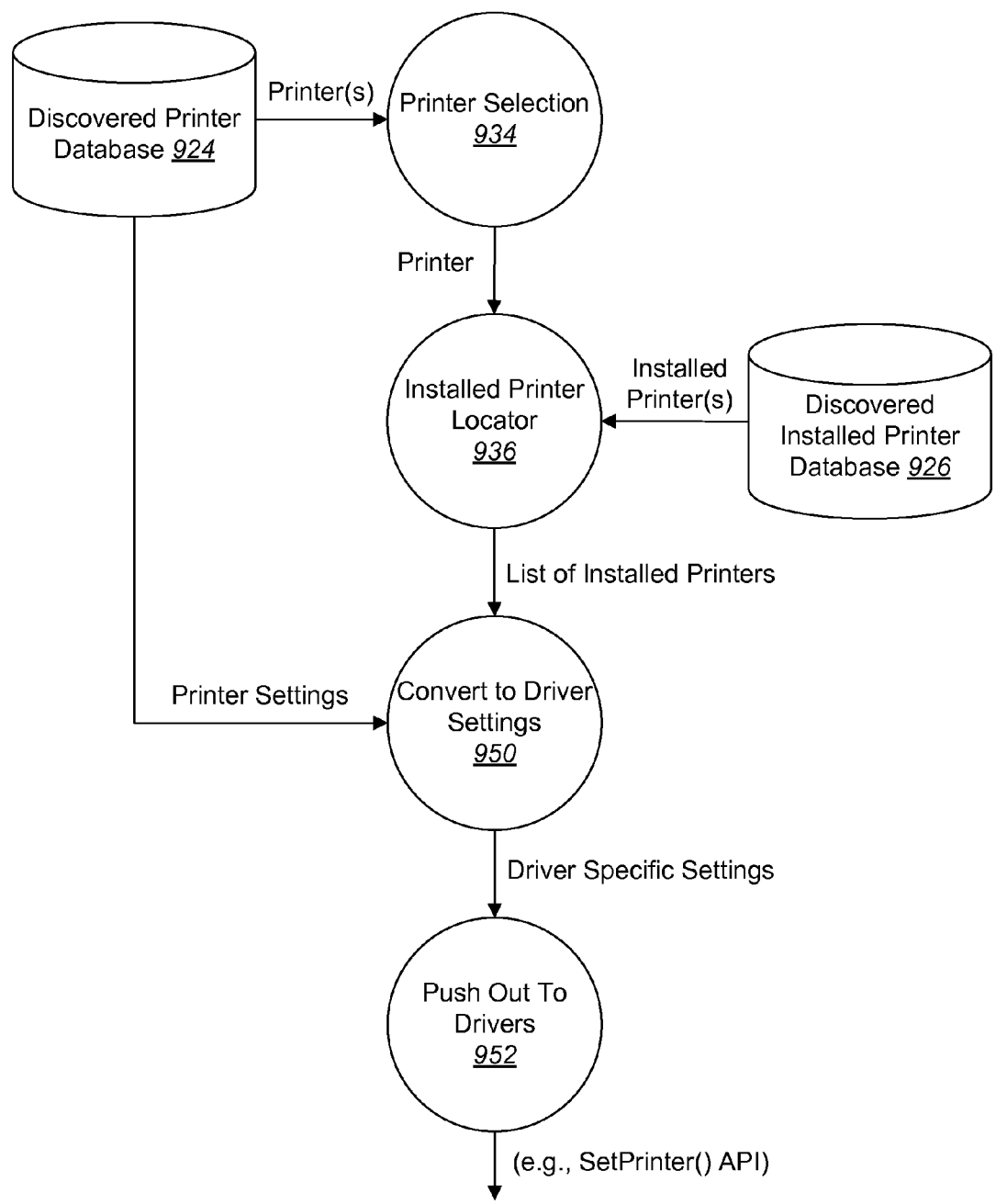
FIG. 9 is a block diagram of an embodiment for updating selected driver settings to corresponding installed printers.

FIG. 9 is a block diagram of an embodiment for updating selected driver settings to corresponding installed printers. Once the printer management utility 110 has determined the set of default device settings, the utility 110 queries the discovered installed printer database 926 to identify 936 all installed printers associated with the communication address of the printer.

The utility 110 then establishes a connection with the remote spooler of each of the installed printers. For example, in Microsoft Windows, this can be done using the Win32 OpenPrinter( ) API call with the appropriate network administrative authority. Next, the printer management utility 110 converts 950 the device default settings into the equivalent driver specific default settings of the associated installed printer. For example, in Microsoft Windows 95/98/Me/NT/2000/2003/XP, the driver settings are specified in a DEVMODE structure. The DEVMODE structure is composed of two parts: a device independent part and a device dependent part. The first part holds settings for a set of common settings in a standard format, such as copies, collation, duplex, paper size, orientation, n-up, etc. In this case, the utility 110 can convert the device setting into the driver setting based on the predetermined format. Otherwise, the second part of the DEVMODE is specific to the driver. In one mode, the utility 110 may query a Driver Database, similar to a PMDB 842, which contains a mapping of device settings to driver settings. In another example, in Microsoft Windows Vista, the driver settings are specified in an XML structure referred to as a PrintCapabilities and PrintTicket schema.

Once the printer management utility 110 has the driver settings, the utility 110 then issues a call via the remote spooler to update 952 the driver settings of the corresponding installed printer. For example, in Microsoft Windows, the driver settings can be updated using the Win32 SetPrinter( ) API call with the appropriate network administrative authority.

Figure 10:
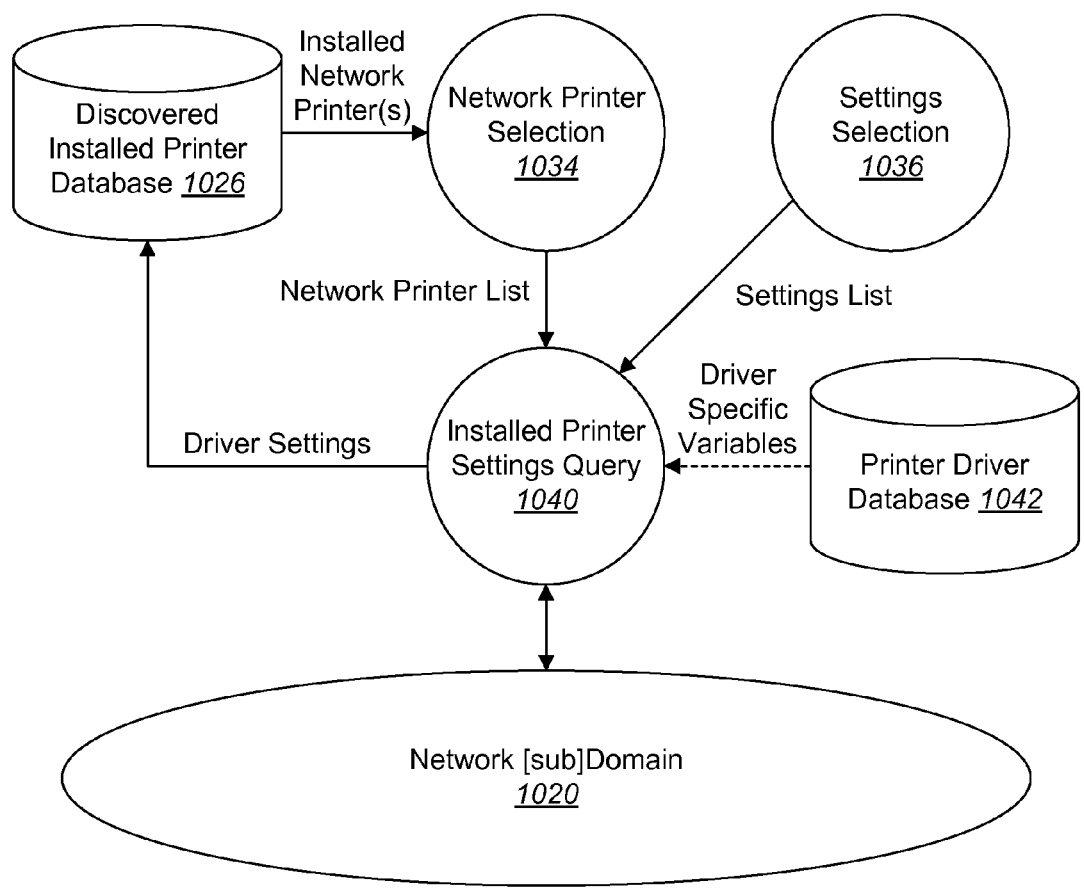
FIG. 10 is a block diagram of an embodiment for obtaining selected printer preference settings from a network print queue.
Figure 11:
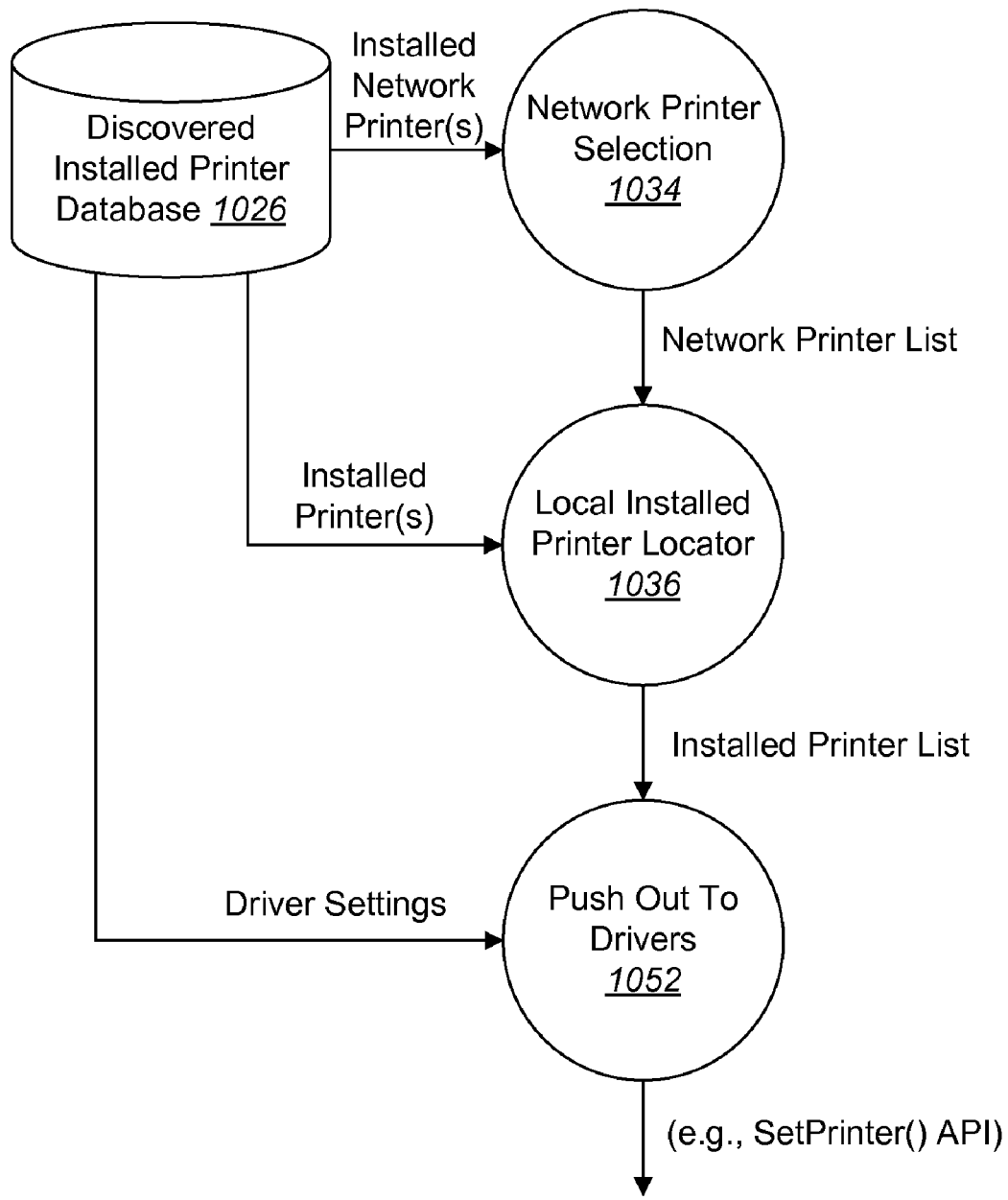
FIG. 11 is a block diagram of an embodiment for pushing out selected network driver settings to the corresponding installed printer drivers.

FIGS. 10 and 11 are block diagrams of an embodiment for obtaining selected printer preference settings from a network print queue and for pushing out selected network driver settings to the corresponding installed printers. In another mode, the reconfiguration of client-side driver settings is based on a select number of default settings 1036 of the corresponding server side installed printer (e.g., shared printer). A print server contains a shared print queue to a printer, and the shared print queue is configured with some set of default print settings. Clients then print to the printer via the shared printer using a network installed printer, whose port connection is to the shared printer.

In some cases, the shared printer does not or cannot enforce the default print settings on the client side, when the print job is generated at the client. The printer management utility 110 may then choose to reconfigure the corresponding client side installed printers to all or some subset of default settings of the shared printer.

Any group of print settings may be reconfigured, such as the groupings discussed earlier. Any group 1034 of shared printers may be selected, such as (1) manually selected by user, (2) based on a physical printer group, (3) based on a print server, or (4) based on a driver type or associated printer model.

When the grouping is derived from a physical printer group, the utility 110 queries the discovered installed printer database to identify the installed shared printer(s) associated with the communication address of the physical printer.

Once the installed shared printers are identified, the utility 110 queries 1040 the discovered installed printer database 1026 to identify the installed client side printer(s) associated with the installed shared printer.

The utility 110 then contacts the remote spooler associated with the installed shared printer, such as using the Win32 OpenPrinter( ) API call. Once a connection is established, the utility 110 then queries, via the remote spooler, the default driver settings of the installed shared printer, such as using the Win32 GetPrinter( ) API call.

The utility 110 then contacts the remote spoolers associated with the installed client side printers. Once a connection is established, the utility 110 then updates 1052, via the remote spooler, the driver settings for the specified settings of the installed client side printers, such as using the Win32 SetPrinter( ) API call.

Figure 12:
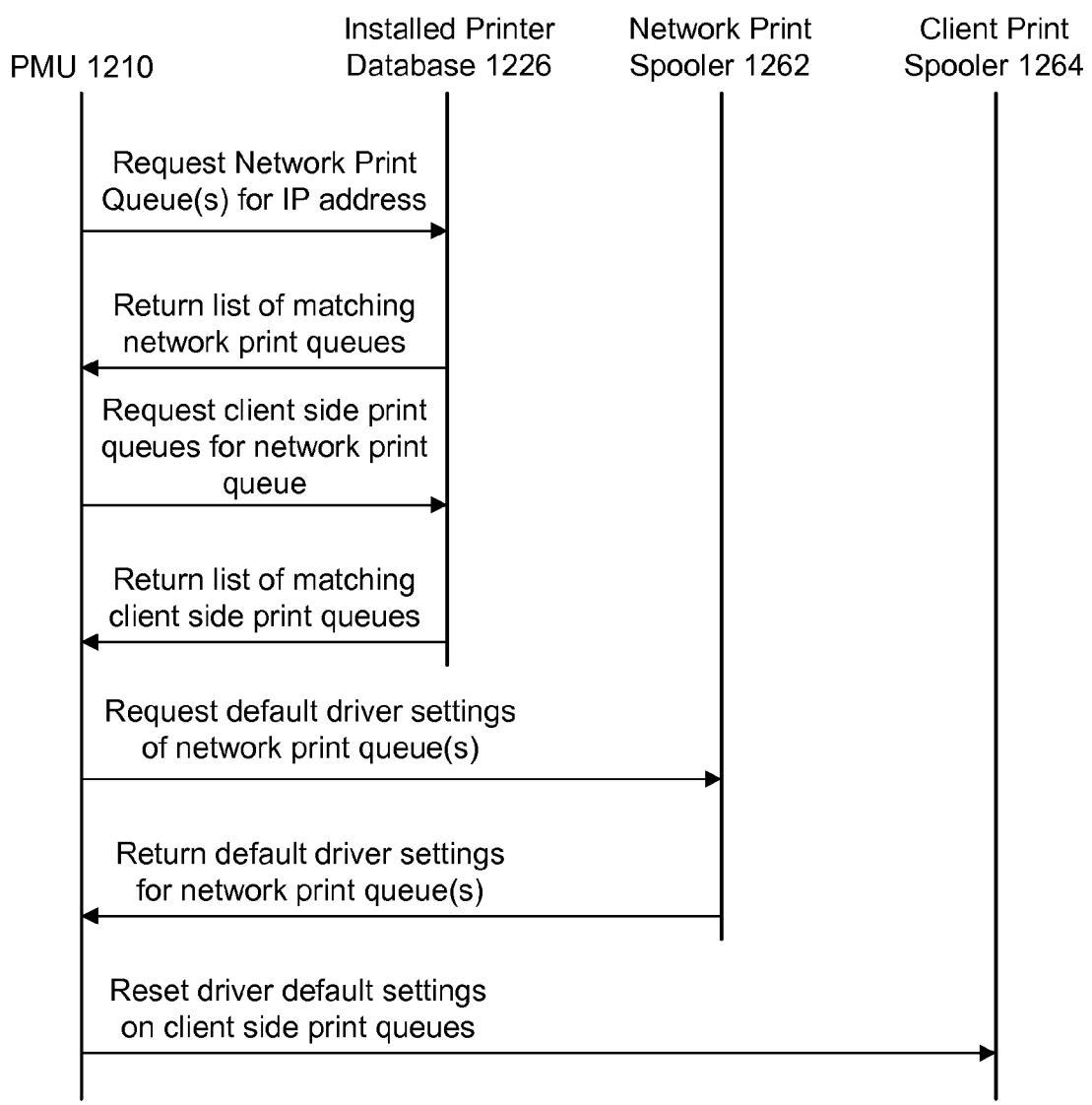
FIG. 12 is a sequence diagram of one embodiment illustrating the method that may be used with the embodiments shown in FIGS. 10 and 11.

FIG. 12 is a sequence diagram of one embodiment illustrating the method that may be used with the embodiments shown in FIGS. 10 and 11. A request 1266 for network print queues is sent from the printer management utility 110 to the installed printer database 1226. A list of matching network print queues is returned 1268. Then a request 1270 for client side print queues is sent from the printer management utility 110 to the installed printer database 1226. A list of matching client side print queues is returned 1272. A request 1274 for default driver settings of network print queues is sent to the network print spooler 1262, and default driver settings for the network print queues are returned 1276. Finally, the driver's default settings on the client side print queues are reset 1278.

Figure 13:
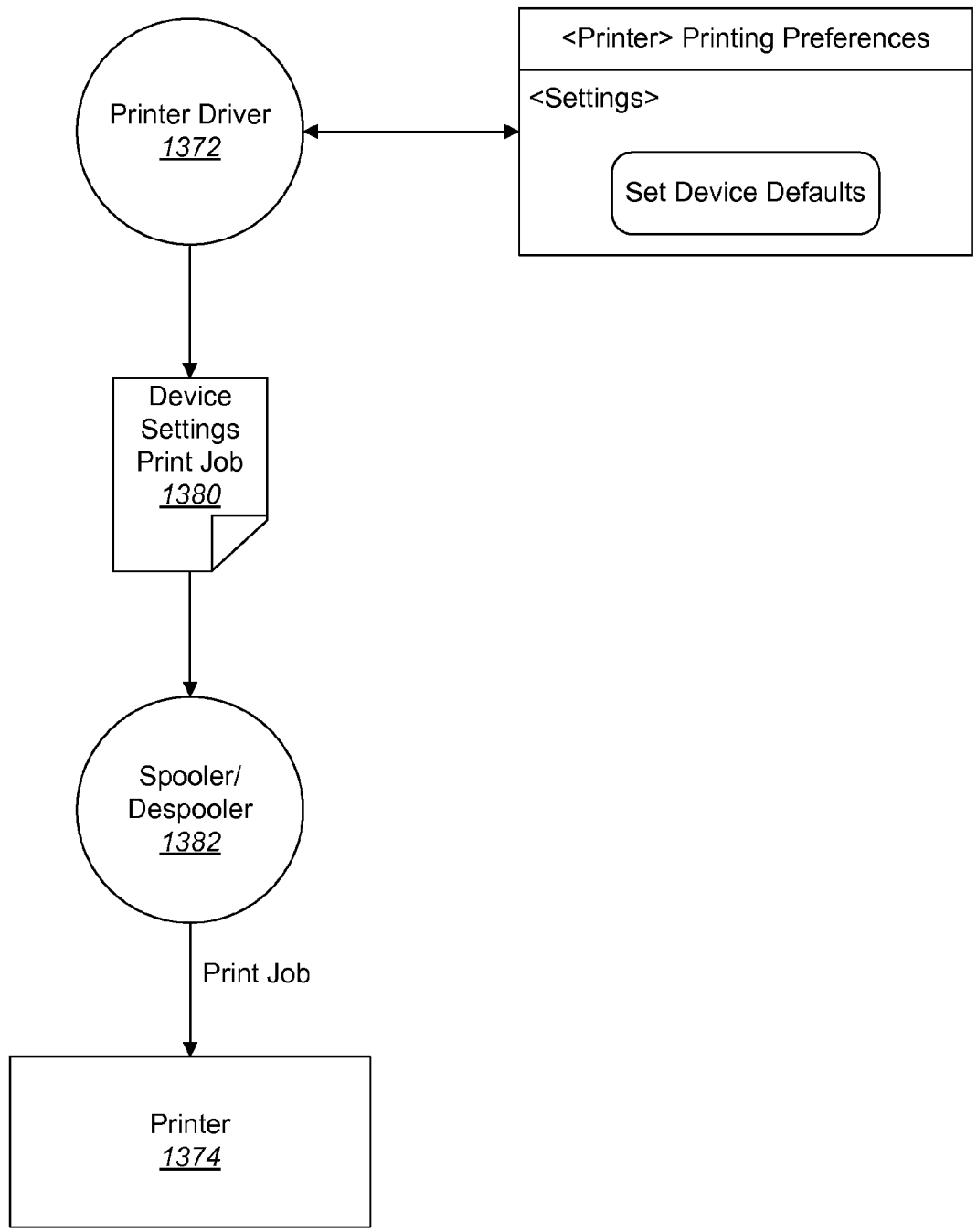
FIG. 13 is a block diagram of an embodiment of an installed printer driver that sets a device's default settings.

FIG. 13 is a block diagram of an embodiment of an installed printer using the configured printer driver, that sets a device's default settings. In another embodiment, a printer driver 1372 is able to update the default device settings of the associated physical printer 1374, in a manner similar to updating the printing preferences of the printer driver. In this embodiment, the user invokes the driver 1372 to configure the driver's default print settings, such as via a printer preferences dialog box 1376. Once the user has completed specifying the settings, the user has an option 1378 to specify that the settings should be applied to, or in addition to, the device 1374 (vs. the driver). This may be done as an extra option on the settings dialog 1376.

If the user chooses to update the device's default settings, in place of or in addition to, the printer driver constructs a print job 1380 which instructs the printer 1374 to update the device's default settings, such as in the manner described above. The driver 1372 then spools the device setting print job 1380 to the local spooler 1382 to be despooled to the printer 1374.

In yet another variation, the extra option 1378 on the dialog 1376 indicates to set the driver's settings based on the device's default settings. In this case, the printer driver 1372 constructs a print job 1380 that instructs the printer 1374 to send back the device's default settings, via a bi-directional connection, such as in the manner described above. Upon receipt, the driver 1372 then sets the driver's default settings according to the device's default settings.

Figure 14:
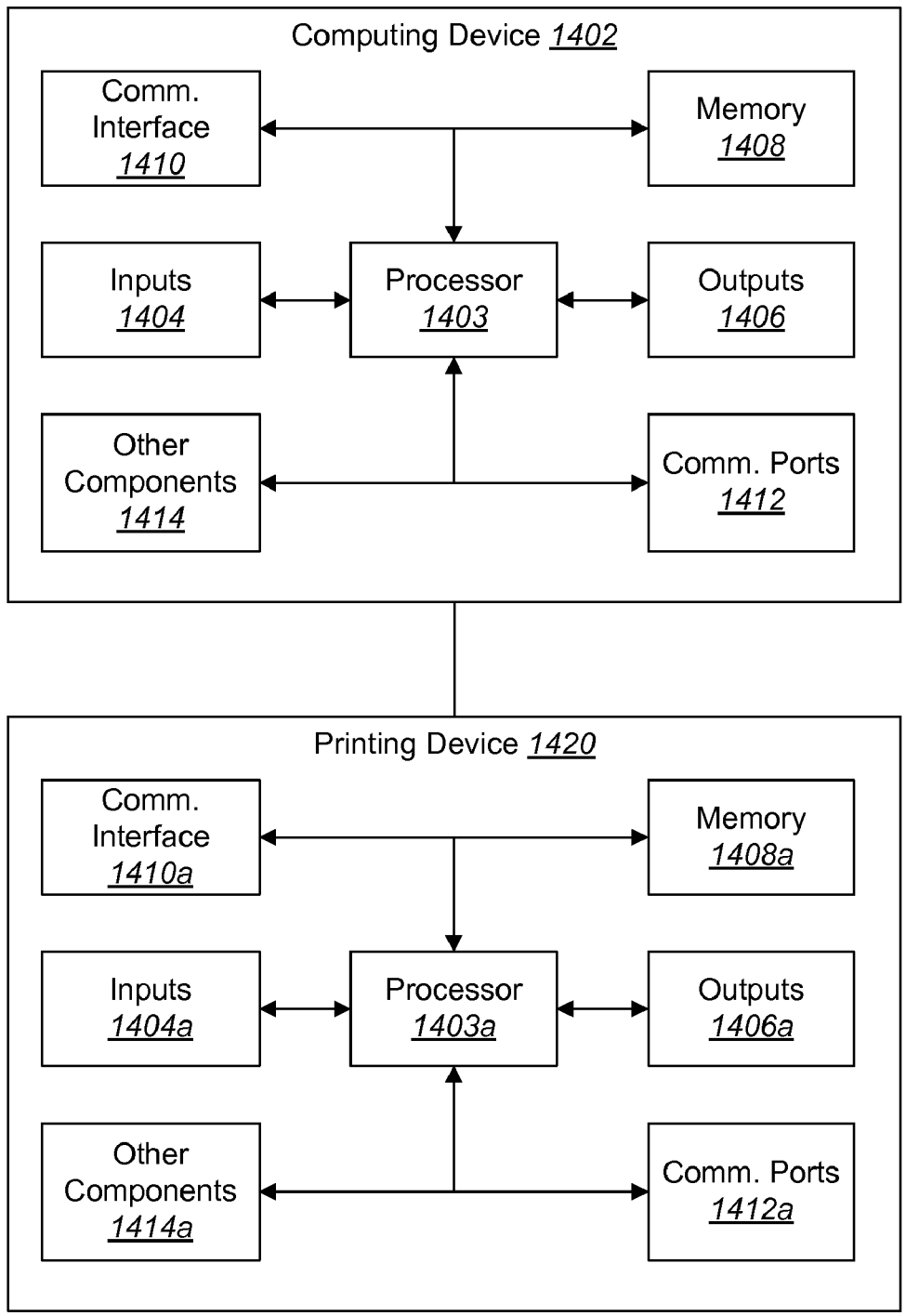
FIG. 14 is a block diagram illustrating the major hardware components typically utilized with embodiments herein.

FIG. 14 is a block diagram illustrating the major hardware components typically utilized with embodiments herein. The systems and methods disclosed may be used with a computing device 1402 and a printing device 1420. Computing devices 1402 are known in the art and are commercially available. The major hardware components typically utilized in a computing device 1402 are illustrated in FIG. 14. A computing device 1402 typically includes a processor 1403 in electronic communication with input components or devices 1404 and/or output components or devices 1406.

The processor 1403 controls the operation of the computing device 1402 and may be embodied as a microprocessor, a microcontroller, a digital signal processor (DSP) or other device known in the art. The processor 1403 typically performs logical and arithmetic operations based on program instructions stored within the memory 1408.

The processor 1403 is operably connected to input 1404 and/or output devices 1406 capable of electronic communication with the processor 1403, or, in other words, to devices capable of input and/or output in the form of an electrical signal. Embodiments of devices 1402 may include the inputs 1404, outputs 1406 and the processor 1403 within the same physical structure or in separate housings or structures. Examples of different kinds of input devices 1404 include a keyboard, mouse, microphone, remote control device, button, joystick, trackball, touchpad, lightpen, etc. Examples of different kinds of output devices 1406 include a speaker, printer, etc. One specific type of output device which is typically included in a computer system is a display device (not shown). Display devices used with embodiments disclosed herein may utilize any suitable image projection technology, such as a cathode ray tube (CRT), liquid crystal display (LCD), light-emitting diode (LED), gas plasma, electroluminescence, or the like. A display controller may also be provided, for converting data stored in the memory 1408 into text, graphics, and/or moving images (as appropriate) shown on the display device.

The computing device 1402 may also include memory 1408. The memory 1408 may be a separate component from the processor 1403, or it may be on-board memory 1408 included in the same part as the processor 1403. For example, microcontrollers often include a certain amount of on-board memory. As used herein, the term "memory" 1408 is broadly defined as any electronic component capable of storing electronic information, and may be embodied as read only memory (ROM), random access memory (RAM), magnetic disk storage media, optical storage media, flash memory devices in RAM, on-board memory included with the processor 1403, EPROM memory, EEPROM memory, registers, etc. The memory 1408 typically stores program instructions and other types of data. The program instructions may be executed by the processor 1403 to implement some or all of the methods disclosed herein.

The processor 1403 is also in electronic communication with a communication interface 1410. The communication interface 1410 may be used for communications with other devices 1402, imaging devices 1420, servers, etc. Thus, the communication interfaces 1410 of the various devices 1402 may be designed to communicate with each other to send signals or messages between the computing devices 1402. The communication interfaces 1410 may be based on wired communication technology, wireless communication technology, or both. Examples of different types of communication interfaces 1410 include a serial port, a parallel port, a Universal Serial Bus (USB), an Ethernet adapter, an IEEE 1394 bus interface, a small computer system interface (SCSI) bus interface, an infrared (IRDA) communication port, a Bluetooth wireless communication adapter, a Wi-Fi wireless communication adaptor, and so forth.

The computing device 1402 may also include other communication ports 1412. In addition, other components 1414 may also be included in the electronic computing device 1402.

Many kinds of different devices may be used with embodiments herein. The computing device 1402 may be a one-chip computer, such as a microcontroller, a one-board type of computer, such as a controller, a typical desktop computer, such as an IBM-PC compatible, a Personal Digital Assistant (PDA), a Unix-based workstation, an Apple computer, etc. Accordingly, the block diagram of FIG. 14 is only meant to illustrate typical components of a computing device 1402 and is not meant to limit the scope of embodiments disclosed herein.

The computing device 1402 is in electronic communication with the printing device 1420. A printing device 1420 is a device that receives or transmits an imaging job, such as a Multi-Function Peripheral ("MFP") or computing device. Printing devices include, but are not limited to, physical printers, multi-functional peripherals, a printer pool, a printer cluster, a fax machine, a plotter, a scanner, a copier, a logical device, a computer monitor, a file, an electronic whiteboard, a document server, etc. The printing device may be a single or a plural grouping (e.g., pool or cluster) of two or more devices.

The printing device 1420 is a type of computing device. Thus, the illustrated components of the computing device 1402 may also be typical of the components often found in a printing device 1420. The imaging device 1420 typically includes its own processor 1403a, memory 1408a, inputs 1404a, outputs 1406a, etc., as illustrated.

In light of the definition of a printing device 1420 above, the term print job, as used herein, is broadly defined as any instruction or set of instructions that are sent to an printing device to cause an image to be printed, imaged, scanned, sent, converted, filed, published, etc., to or from the printing device 1420. Thus, the term print job includes, but is not limited to, a fax instruction or job to send a fax, a print job to print to a file, a print job to print to a particular window in a graphical user interface, a scan job to scan in an image from a scanner, a print job to print to a physical printer, a document manipulation job, a document conversion job, etc. Scan jobs and scanning devices are used to illustrate exemplary embodiments, but other kinds of imaging jobs and imaging devices may be used in implementations of the embodiments disclosed herein.

Figure 15:
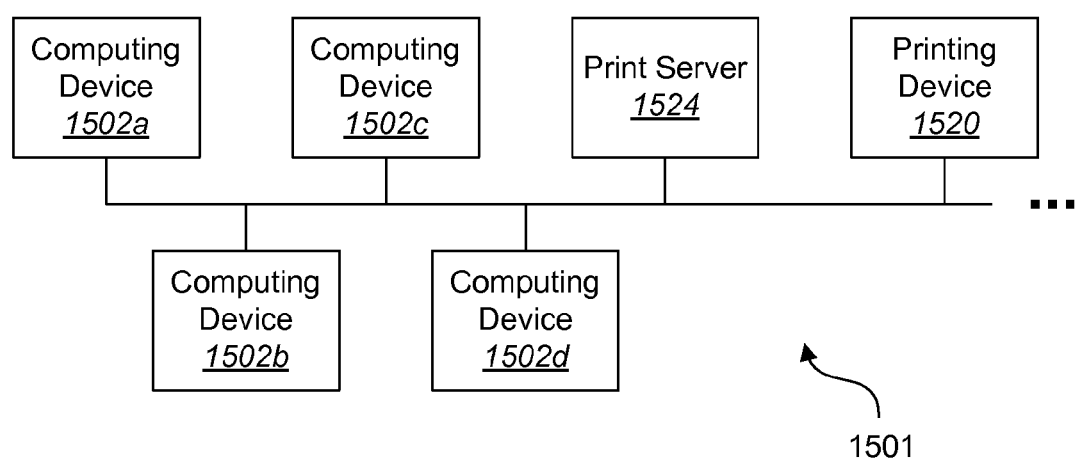
FIG. 15 is a network block diagram illustrating one possible environment in which the present systems and methods may be implemented.

FIG. 15 is a network block diagram illustrating one possible environment in which the present systems and methods may be implemented. The present systems and methods may also be implemented on a standalone computer system. FIG. 15 illustrates a computer network comprising a plurality of computing devices 1502, a printing device 1520 a print server 1524.

The term "network" may refer to any combination of computing devices and peripherals, such as printing devices, wherein the devices can communicate with each other. The term "network" may comprise Local Area Networks (LANs), Wide Area Networks (WANs) and many other network types. A network may be connected using conventional conductive cable, fiber-optic cable, phone line cable, power line cable or other electrical and light conductors and other signal transmission media as well as wireless connections using infrared, RF or other wireless methods.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for managing printer settings comprising:
    discovering, at a computing device, physical printers in electronic communication with a network;
    discovering, at the computing device, installed printer drivers via querying at least one spooler to enumerate the installed printer drivers;
    associating, at the computing device, the physical printers with the installed printer drivers;
    specifying, at the computing device, one or more default print settings; and
    updating, at a remote computing device, the one or more default print settings of at least one of the installed printer drivers to the specified one or more default print settings.

2. The method of claim 1, further comprising obtaining information about the installed printer drivers.

3. The method of claim 2, further comprising storing the information about the installed printer drivers in an installed printer database.

4. The method of claim 1, wherein the one or more default print settings are specified remotely from the remote computing device that stores the installed printer drivers.

5. The method of claim 1, further comprising specifying the discovered physical printers into one or more groups of physical printers.

6. The method of claim 5, further comprising specifying the one or more default print settings for the one or more groups of physical printers.

7. The method of claim 6, further comprising identifying at least one of the installed printer drivers based on the one or more groups of physical printers specified.

8. The method of claim 1, further comprising querying one of a physical printers for at least one of the physical printer's default settings.

9. The method of claim 1, further comprising using a subnet or range of communication addresses to discover the physical printers.

10. The method of claim 1, further comprising determining communication addresses for the physical printers associated with each of the discovered installed printer drivers.

11. An apparatus for managing printer driver settings comprising:
    a processor;
    a memory in electronic communication with the processor;
    instructions stored in the memory, the instructions being executable by the processor to:

discover physical printers in electronic communication with a network;

discover installed printer drivers via querying at least one spooler to enumerate installed printer drivers;

associate the physical printers with the installed printer drivers;

specify one or more default print settings; and update, at a remote computing device, the one or more default print settings of at least one of the installed printer drivers to the specified one or more default print settings.

12. The apparatus of claim 11, wherein the instructions are further executable to obtain information about the installed printer drivers.

13. The apparatus of claim 12, wherein the instructions are further executable to store the information about the installed printer drivers in an installed printer database.

14. The apparatus of claim 11, wherein the one or more default print settings are specified remotely from the remote computing device that stores the installed printer drivers.

15. The apparatus of claim 11, wherein the instructions are further executable to specify the discovered physical printers into one or more groups of physical printers.

16. The apparatus of claim 15, wherein the instructions are further executable to specify the one or more default print settings for the one or more groups of physical printers.

17. The apparatus of claim 16, wherein the instructions are further executable to identify at least one of the installed printer drivers based on the one or more groups of physical printers specified.

18. The apparatus of claim 11, wherein the instructions are further executable to query one of the physical printers for at least one of a physical printer's default settings.

19. The apparatus of claim 11, wherein the instructions are further executable to determine communication addresses for the physical printers associated with each of the discovered installed printer drivers.

20. A non-transitory computer-readable medium comprising executable instructions for managing printer settings, the instructions being executable to:

discover physical printers in electronic communication with a network;

discover installed printer drivers via querying at least one spooler to enumerate installed printer drivers;

associate the physical printers with the installed printer drivers;

specify one or more default print settings; and update, at a remote computing device, the one or more default print settings of at least one of the installed printer drivers to the specified one or more default print settings.

* * * * *

UNITED STATES PATENT AND TRADEMARK OFFICE
CERTIFICATE OF CORRECTION

PATENT NO. : 8,305,602 B2 Page 1 of 1
APPLICATION NO. : 11/537433
DATED : November 6, 2012
INVENTOR(S) : Andrew R. Ferlitsch et al.

It is certified that error appears in the above-identified patent and that said Letters Patent is hereby corrected as shown below:

In the Claims

In column 14, line 54, claim 8, please delete "a physical printers for at least one of the physical printer's" and replace it with --the physical printers for at least one of a physical printer's--.

Signed and Sealed this
Fifteenth Day of October, 2013

Teresa Stanek Rea
*Deputy Director of the United States Patent and Trademark Office*